Feb. 2, 1960 — E. SAUER — 2,923,217
PHOTOGRAPHIC CAMERA WITH CENTRAL SHUTTER
Filed Feb. 10, 1956 — 2 Sheets-Sheet 1

Inventor
Edgar Sauer
by Singer, Stern & Carlberg
Attorneys

Feb. 2, 1960  E. SAUER  2,923,217
PHOTOGRAPHIC CAMERA WITH CENTRAL SHUTTER
Filed Feb. 10, 1956  2 Sheets-Sheet 2
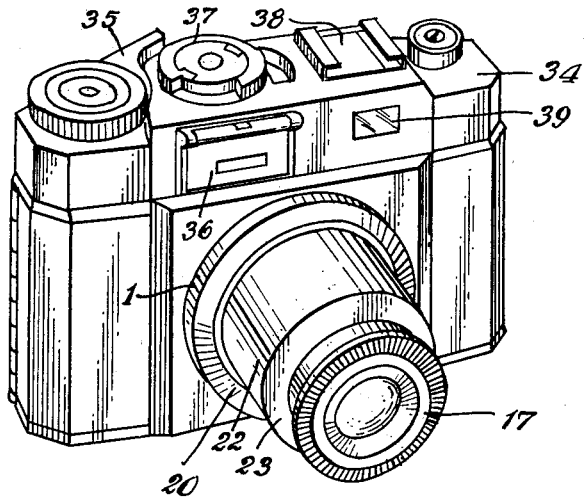
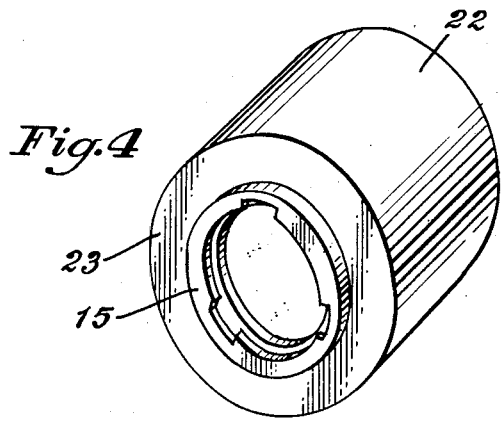
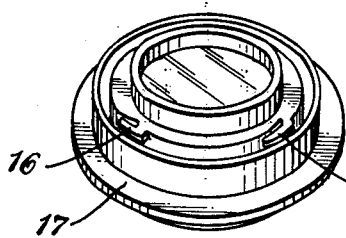
Inventor
Edgar Sauer
by Singer, Stern & Carlberg
Attorneys

United States Patent Office 2,923,217
Patented Feb. 2, 1960

2,923,217

PHOTOGRAPHIC CAMERA WITH CENTRAL SHUTTER

Edgar Sauer, Stuttgart, Germany, assignor to Zeiss Ikon A.G. Stuttgart, Stuttgart, Germany Application February 10, 1956, Serial No. 564,775

Claims priority, application Germany February 12, 1955

1 Claim. (Cl. 95—11)

This invention relates generally to photographic cameras and more particularly to an improved lens mounting arrangement for cameras employing a central shutter.

In conventional arrangements the central shutter is provided with a casing composed of an outer barrel and an inner barrel. The outer barrel has a reduced diameter portion at its rear end and is attached to the front wall of the camera casing while the front end has a larger diameter portion which receives the inner barrel of the shutter casing. This inner barrel is provided with outwardly directed front and rear flanges. The rear flange fits into the outer barrel and is secured to a shoulder in the rear portion of the outer barrel, which shoulder is arranged on a flange connecting the outer portion of the outer barrel with the reduced rear portion of the same. The front flange of the inner barrel extends outwardly over the front end of the outer barrel and is equipped with a plurality of bayonet joint components which engage and secure cooperating joint parts of the removable objective lens system.

With this arrangement, the entire load of the objective lens system is carried on the unsupported front flange of the inner barrel. Such an arrangement is undesirable, particularly when heavy and long telescopic objective lenses are attached to the shutter casing, because the inner barrel is loaded to an extent causing it to deflect appreciably, tilting the optical axis of the objective lens system from alignment with the true axis of the camera.

One object of this invention is to provide a camera having a mounting arrangement for interchangeable objective lens systems, which is simple with respect to operating requirements and does not apply objectionable lens loads to the camera shutter system.

Another object of this invention is to provide a camera having a mounting arrangement of the character referred to, which is adaptable to existing camera designs, without requiring expensive reconstruction of the housing or relocation of operating components.

Further objects of the invention are to provide a sturdy support for interchangeable objective lenses on a central shutter type of camera, which support provides a positive alignment of the objective lens system with the camera axis.

The foregoing objects are merely illustrative of the various aims and objects of this invention. Other objects and advantages will become apparent upon a study of the following specification in conjunction with the accompanying drawings, in which:

Fig. 3 is a perspective view of a camera embodying the novel structural objective lens support of this invention.

Fig. 4 is a perspective view of the outer lens supporting barrel, showing one part of the bayonet connection in the front flange thereof, and Fig. 5 is a perspective view of the objective lens assembly, showing the other parts of the bayonet connection which interfit with those in the outer lens barrel.

Figure 1:
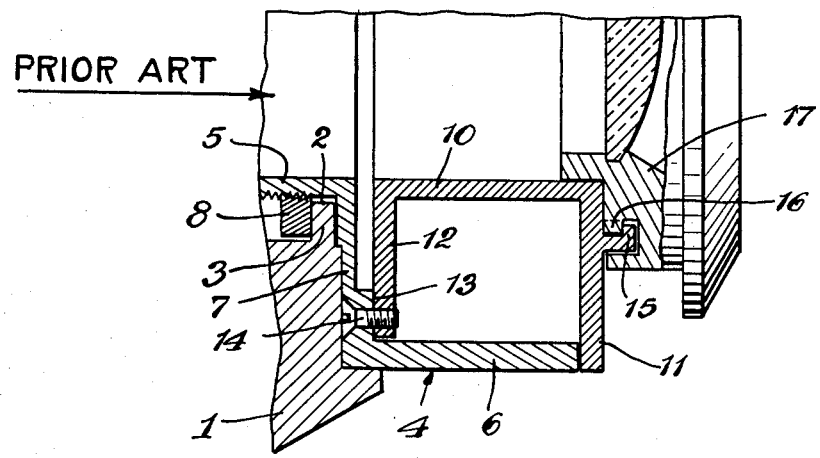
Fig. 1 is a longitudinal half section of a prior art objective lens support arrangement.

The prior art arrangement of Fig. 1 is presented to more clearly illustrate the novel features of this invention. In Fig. 1, the camera housing is designated 1 which is provided with a central substantially circular opening generally designated 2, defined by the inner peripherial face of an inwardly directed housing flange 3. The shutter mechanism casing 4 consists of an outer barrel of substantially Z-shaped cross section which comprises an externally threaded sleeve 5 and an outer larger diameter barrel section 6, connected to the sleeve 5 by a radial flange 7. An internally threaded ring 8 seating against the back face of the housing flange 3 engages the externally threaded portion of the sleeve 5 drawing the flange 7 toward the front face of flange 3 to hold the shutter mechanism casing in place against the front wall of the camera casing 1.

An inner barrel 10 of substantially U-shaped cross section is provided with outwardly directed front and rear flanges 11 and 12, respectively. The rear flange 12 slides within the outer barrel section 6 and its outer marginal rear face abuts a seat 13 formed on the inner face of the flange 7. Screws 14 connect the parts 7 and 12 with each other. The front flange 11 carries bayonet joint parts 15 which engage cooperating bayonet joint parts 16 on the objective lens mount 17 to removably secure the objective lens system to the shutter mechanism casing.

It will be noted that the shutter mechanism casing in addition to holding therein the shutter mechanism also is used to support the objective lens assembly 17. The objective lens system is however relatively heavy and tends to bend and deflect the inner barrel 10. This is particularly true when longer and heavier telescopic objective lens systems are employed. It is evident from the drawing that the structural configuration of the inner barrel is not very strong for carrying the bending load imposed thereon by the objective lens assembly. The inner barrel, because of the relatively long rear flange moment arm is easily deflected, resulting in misalignment of the optical axes and distortion of the inner barrel, which latter may interfere with the operation of the central shutter mechanism (not shown).

Figure 2:
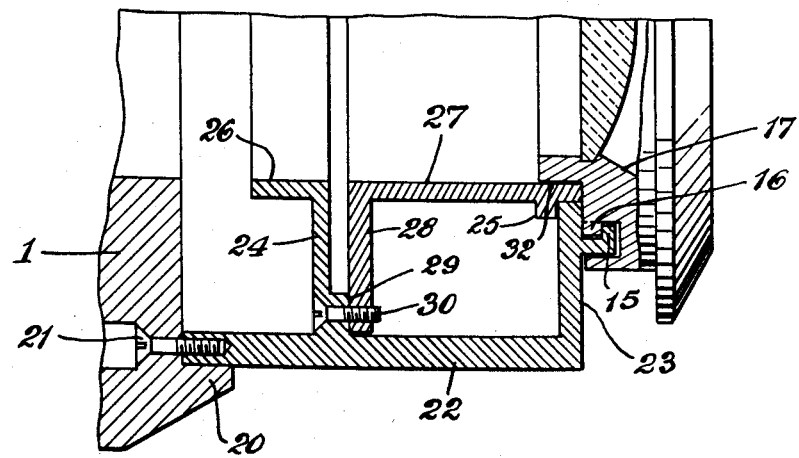
Fig. 2 is a longitudinal half section of an objective lens support arrangement embodying the principles of this invention.

The inventive arrangement shown in Fig. 2 overcomes the above mentioned disadvantages by providing objective lens support which imposes no loads on the inner barrel of the shutter mechanism casing and which provides a stable and rigid objective lens support which is free of deflection or deformation even with rough handling, thereby preventing tilting of the optical axis of the lens assembly with respect to the camera. Briefly, this is accomplished by mounting the objective lens assembly on the outer barrel of the shutter mechanism casing, thereby, providing a large diameter stable rear mount and by carrying the inner barrel of the shutter mechanism casing as before in the outer barrel of the same in such a way that loads other than the load of the central shutter mechanism are not imposed thereon.

In Fig. 2 the camera housing 1 is drilled and counterbored inside its socket forming flange 20 and screws 21 enter suitably tapped holes in the rear edge of outer barrel 22. Thus the outer barrel 22 forms a large diameter stable support. A front, inwardly directed flange 23 on the barrel 22 carries the parts 15 of the bayonet joint assembly which interlock with the cooperating parts 16 on the objective lens mount 17. Thus all the load of the objective lens assembly is concentrated on the outer barrel 22. Moreover the thickness of this barrel 22 may be easily selected at some optimum value providing optimum rigidity. A second inwardly directed flange 24 disposed intermediate the front flange 23 and the rear edge of the outer barrel 22, terminates in a tubular section 26 which is directed rearwardly. This tubular section 26 corresponds to the rear sleeve 5 of the outer barrel 6 in Fig. 1, but unlike the arrangement of said Fig. 1, is not subjected to the weight of the objective lens system and the inner barrel and the shutter mechanism. In Fig. 1 this sleeve 5 supports the rear part of the lens system (not shown). Obviously any deflection of the lens mount is intolerable. The lens mount 26, in Fig. 2 however, is devoid of such weight and consequently provides a secure seat for the rear portion of the objective lens system to be mounted therein.

The inner barrel 27 is provided with an outwardly directed rear flange 28, the outer peripheral margin of which seats against a seat 29 at the outer marginal edge of flange 24, where the flange 28 is secured by screws 30. The front end of inner barrel 27 projects into an annular space 32 formed between the inner peripheral edge of front flange 23 and a cylindrical annular portion of the lens mount 17. The inner barrel 27 is provided with a flange 25. The rear portion of the outer barrel 22 is made of a length to adjust the camera to the focal length of the objective used. This length of the outer barrel 22 can be adjusted as required and outer barrels of different length may be used for different objective lens systems.

The general organization of this invention is shown in its perspective views in Figs. 3, 4, and 5. In Fig. 3, the objective lens assembly 17 is shown mounted in the flange 23 of the outer barrel 22, which in turn fits into a socket formed in the front wall of the camera housing 34 by the flange 20. The camera housing 34 conventionally supports the finder optics (not shown) and film transporting spool controlled externally by a lever 35. An exposure meter 36 with its calculating device 37 and an insertion guide 38 are shown. The view finder opening is designated with 39.

The cylindrical configuration of the outer barrel 22 is evident from Fig. 4 together with the general arrangement of the bayonet joint parts 15, which interlock with the cooperating parts 16 shown in Fig. 5 on the back face of the objective lens assembly 17.

From the foregoing it will be apparent that the specific embodiment herein illustrated provides an arrangement wherein a stable support is provided for the objective lens system. Altough but one specific embodiment of the present invention has been herein illustrated and described, it will be appreciated by those skilled in the art, that this invention, both in its details and in its organization of such details, is not limited, but is susceptible of modification without departing from the spirit and scope hereof.

The invention is claimed as follows:

In a photographic camera, a camera casing provided with a front wall and having a central opening coaxial with the optical axis of said camera, said camera casing being provided with an annular flange concentric with the opening in the camera casing and spaced therefrom, a casing for a central shutter mechanism attached to said front wall, said shutter casing mechanism including an outer cylindrical barrel with one end slidably received in said annular flange on said camera casing, an inwardly extending flange on the outer end of said outer cylindrical barrel forming an opening of a diameter substantially equal to the opening in the front wall of the camera casing, said outer cylindrical barrel being provided with an intermediate inwardly directed flange having an annular portion extending in the direction of said front wall and spaced therefrom, an inner cylindrical barrel having a bore diameter substantially equal to the diameter of the opening in the camera front wall provided at its inner end with an annular flange directed radially toward the outer barrel, means for connecting said flange of said inner barrel to the intermediate flange of said outer barrel, an annular rib on the outer end of said inner barrel spaced a slight distance from the end thereof adapted to form a seating portion to receive the inner edge of the inwardly extending flange on the outer end of said outer barrel, said inwardly extending flange on the outer end of said outer barrel having connecting means thereon, an objective mounting interlockingly connected to said connecting means, and having an annular projection extending into the outer end of the inner barrel, and threaded fasteners extending through the camera casing received in correspondingly threaded axially extending openings in the inner end of the outer barrel for securing said outer barrel to said camera front wall adjacent the annular flange of said camera casing front wall.

References Cited in the file of this patent

UNITED STATES PATENTS

| | | |
|---|---|---|
| 2,283,788 | Breichle et al. | May 19, 1942 |
| 2,335,439 | Nerwin et al. | Nov. 30, 1943 |
| 2,348,510 | Aiken | May 9, 1944 |
| 2,474,323 | Rattray | June 28, 1949 |
| 2,482,596 | Rattray et al. | Sept. 20, 1949 |
| 2,511,201 | Fuerst | June 13, 1950 |
| 2,822,721 | Parker et al. | Feb. 11, 1958 |